United States Patent
Milne et al.

(10) Patent No.: US 9,429,037 B2
(45) Date of Patent: Aug. 30, 2016

(54) TURBINE INCLUDING SEAL AIR VALVE SYSTEM

(75) Inventors: Trevor Milne, Sheffield (GB); Christopher Sidney, Loughborough (GB)

(73) Assignee: SIEMENS AKTIENGESELLSCHAFT, München (DE)

( * ) Notice: Subject to any disclaimer, the term of this patent is extended or adjusted under 35 U.S.C. 154(b) by 769 days.

(21) Appl. No.: 13/643,112

(22) PCT Filed: Mar. 30, 2011

(86) PCT No.: PCT/EP2011/054929
§ 371 (c)(1),
(2), (4) Date: Oct. 24, 2012

(87) PCT Pub. No.: WO2011/134730
PCT Pub. Date: Nov. 3, 2011

(65) Prior Publication Data
US 2013/0039739 A1 Feb. 14, 2013

(30) Foreign Application Priority Data

Apr. 28, 2010 (EP) .................................... 10161310

(51) Int. Cl.
| | |
|---|---|
| F01D 25/18 | (2006.01) |
| F02C 7/28 | (2006.01) |
| F01D 11/06 | (2006.01) |
| F01D 11/02 | (2006.01) |
| F01D 11/04 | (2006.01) |

(52) U.S. Cl.
CPC ............. *F01D 25/183* (2013.01); *F01D 11/06* (2013.01); *F02C 7/28* (2013.01); *F01D 11/02* (2013.01); *F01D 11/04* (2013.01); *F05D 2270/09* (2013.01); *F05D 2270/304* (2013.01)

(58) Field of Classification Search
CPC ........ F01D 11/02; F01D 11/04; F01D 11/06; F01D 25/183; F05D 2270/09; F05D 2270/304; F02C 7/28
See application file for complete search history.

(56) References Cited

U.S. PATENT DOCUMENTS

| | | | |
|---|---|---|---|
| 4,156,342 A | 5/1979 | Danko | |
| 4,193,603 A * | 3/1980 | Sood | .............................. 277/304 |
| 4,433,539 A | 2/1984 | Norris | |
| 6,142,672 A * | 11/2000 | Bently | ................ F16C 32/0644 384/118 |
| 7,584,619 B2 * | 9/2009 | Granitz et al. | ................... 60/785 |
| 7,661,270 B2 * | 2/2010 | Morimoto et al. | ............. 60/785 |
| 2007/0107438 A1 | 5/2007 | Koichi | |
| 2007/0180830 A1 | 8/2007 | Granitz | |

FOREIGN PATENT DOCUMENTS

| | | |
|---|---|---|
| CN | 1127327 A | 7/1996 |
| CN | 1421594 A | 6/2003 |
| EP | 0354422 B1 | 6/1992 |
| FR | 2698406 B1 | 12/1994 |
| GB | 702931 A | 1/1954 |
| GB | 2111607 B | 9/1985 |
| RU | 2167322 C2 | 5/2001 |
| RU | 2211936 C2 | 9/2003 |

\* cited by examiner

*Primary Examiner* — Richard Edgar
*Assistant Examiner* — Brian P Wolcott

(57) ABSTRACT

A turbine includes a rotor, a fluid bearing for rotatably supporting the rotor, an air supply conduit system for supplying air towards the fluid bearing, a discharge conduit system for discharging a portion of the supplied air and a control system arranged to change an amount of air discharging through the discharge conduit system based on a running condition of the turbine.

14 Claims, 2 Drawing Sheets

TURBINE INCLUDING SEAL AIR VALVE SYSTEM

CROSS REFERENCE TO RELATED APPLICATIONS

This application is the US National Stage of International Application No. PCT/EP2011/054929 filed Mar. 30, 2011, and claims the benefit thereof. The International Application claims the benefits of European Patent Application No. 10161310.7 EP filed Apr. 28, 2010. All of the applications are incorporated by reference herein in their entirety.

FIELD OF INVENTION

The present invention relates to a turbine, in particular to a gas turbine. In particular the present invention relates to a turbine comprising a discharge pipe system and a control system arranged to change an amount of air discharging through the discharge pipe system.

ART BACKGROUND

A gas turbine is known to comprise a rotor or turbine shaft which is rotatably supported by a bearing, a compressor including rotor blades mounted at the rotor to compress air, a combustor for burning a mixture of fuel and the compressed air, and a turbine portion which converts the energy contained in the burned mixture of fuel and compressed air into mechanical energy to drive the rotor. A gas turbine may for example be used to generate electric energy by driving a generator using the mechanical energy.

From US 2007/0107438 A1 a gas turbine is known, wherein the rotor is rotatably supported by bearings including lubricating oil. Seal rings are provided near the bearings so that the lubricating oil does not flow out of the bearings. In addition, seal air which is extracted from the compressor is supplied to the seal rings so that the lubricating oil does not leak out of the bearings. The turbine compressor or a supplementary air source may be utilized to provide the seal air. A valve arrangement is provided for switching between the gas turbine internal air source and the supplementary air source.

GB 702,931 discloses a rotary machine, wherein air bled from the high pressure compressor is used to exclude lubricating oil from the air flow passages of the compressor.

GB 2 111 607 A discloses a bearing chamber pressurization system, wherein a pressure sensing valve controls the air supply to the bearing from two sources having different pressure levels within a gas turbine engine.

EP 0 354 422 B1 discloses a gas turbine, wherein a valve controls the air pressure in the turbine bearing chamber as a function of representative parameters of the operation condition.

FR 2 698 406 discloses a procedure for pressurizing the lubrication chamber of a turbine, wherein the flow is controlled by a valve.

It has been observed that a conventional turbine does not ensure under all operation conditions of the turbine that lubricating oil contained in a bearing chamber for bearing the rotor is prevented from escaping the bearing chamber towards other components of the turbine. Further, it has been observed that under certain operation conditions the demand of air provided by an external compressor is relatively high which adds significant costs and also reduces the efficiency of the overall system.

An object of the present invention is to provide a turbine having a smaller demand on seal air from an external compressor, thus having a higher efficiency, and which at the same time ensures that no bearing fluid, in particular oil, escapes from the bearing chamber.

Another object of the present invention is to provide a turbine improved in particular during certain operation conditions, such as hot shut-down, where the turbine is rapidly shut-down for example by shutting off the fuel supply in the case of an operational failure.

SUMMARY OF THE INVENTION

According to an embodiment a turbine is provided which comprises a rotor; a fluid bearing for rotatably supporting the rotor; an air supply pipe system for supplying air towards the fluid bearing; a discharge pipe system for discharging a portion of the supplied air; and a control system arranged to change an amount of air discharging through the discharge pipe system based on a running condition of the turbine.

In the context of the present application the air supply pipe system is also referred to as air supply conduit system and the discharge pipe system is also referred to as discharge conduit system. Thus, a pipe in the context of the present application not necessarily has a tube like or tubular shape, but may have any shape or may be any structure suitable for guiding or channelling a fluid, in particular air.

In particular the turbine may be a gas turbine. The turbine may comprise a single rotor or two rotors which are separate from each other. Supported by the fluid bearing the rotor is able to rotate about a rotation axis running along an axial direction. The fluid bearing may comprise any gaseous fluid or liquid fluid, in particular oil. The fluid may be supplied under pressure for example by pumping fluid, in particular oil, into a bearing chamber of the fluid bearing. Thereby, a thin layer of fluid may fill a clearance between a bearing face of the rotor, also called journal of the rotor or of the shaft, and a bearing face of a stator part of the turbine within a bearing chamber of the fluid bearing. The fluid may continuously be pumped into the bearing chamber to maintain the thin layer of fluid in between the bearing faces rotating relative to each other.

The air supply pipe system for supplying air towards the fluid bearing may comprise one or more air supply pipes at different axial positions and/or at different circumferential positions of the turbine. The air supply pipe system may also be referred to as seal air feed. Air from different sources may be supplied to the air supply pipe system. For example, air bled from a compressor of the turbine or air generated by an external compressor may be supplied to the air supply pipe system. Using one or more valves air from these different sources may also be mixed or combined to achieve a desired pressure, temperature, volume per time and/or mass per time to be supplied to the air supply pipe system, in particular depending on a running condition of the turbine.

The air supplied towards the fluid bearing using the air supply pipe system may function to prevent the fluid from escaping from the bearing or at least for preventing the fluid from entering other parts of the turbine, such as a compressor exit, where the compressor exits high temperature, high pressure air to be mixed with fuel and to be burned in a combustor of the turbine. Introduction of fluid, in particular oil, into the compressor exit passage would result to problems, such as carbonization and contamination resulting in a reduced durability and/or efficiency of the turbine.

Under normal operation conditions additionally high pressure high temperature air bled from the compressor exit may be supplied towards the fluid bearing to prevent the fluid from escaping the fluid bearing chamber.

The discharge pipe system for discharging a portion of the supplied air may comprise a number of discharge pipes arranged at different axial positions and/or at different circumferential positions of the turbine. The discharge pipe system may discharge excess air supplied towards the fluid bearing and in particular air that is too hot; this is to prevent additional temperature related degradation of the bearing fluid, in particular the oil. The discharge pipe system may lead to atmosphere and/or to an exhaust passage of the turbine.

The control system is arranged to change an amount of air discharging through the discharge pipe system, wherein the amount may be a rate, such as volume of air per time, mass of air per time or a volume of air or a mass of air discharged within a certain time interval, such as within 1 second, 10 seconds, 1 minute, or 5 minutes. The control system may comprise mechanical components, such as one or more valves, one or more sensing devices for sensing the amount of air discharged through the discharge pipe system, as well as software or hardware control modules for reading measurement values of the sensing devices and for adjusting the one or more valves. Thereby, the sensing devices, in particular its probes, may be arranged at one or more locations within the discharge pipe system. Further, the one or more valves may be located in one or more discharge pipes comprised in the discharge pipe system and in particular in a common discharge pipe leading to an outlet external to the turbine.

The running condition of the turbine may be characterized by a fuel supply to one or more combustors of the turbine, by a rotational speed of the rotor, by the amount of air exiting the compressor of the turbine and/or a combination of the aforementioned parameters. In particular, the control system may comprise one or more measuring probes to detect the running condition of the turbine. The control system may be adapted to process measured values and adjust one or more valves by activating one or more actuators. In particular, the control system may be adapted to detect a turbine failure and a condition of a rapid shut-down of the turbine, such as a hot shut-down.

According to an embodiment the control system is adapted to reduce the amount of air discharging through the discharge pipe system, if a rotational speed of the rotor is less than a predetermined value. In this case a supply of air bled from the compressor exit may be reduced and also the amount of air bled from an axial position of the turbine compressor further upstream which is supplied to the air supply pipe system may be reduced. This may be a direct result of the reduced rotational speed of the rotor. Thus, it may be necessary, in order to prevent the fluid from escaping the fluid bearing, to additionally feed air generated by an external compressor to the air supply pipe system for supplying air towards the fluid bearing. At the same time it may not be required to discharge excess air supplied towards the fluid bearing using the discharge pipe system. In other cases the amount of air discharging through the discharge pipe system may at least be reduced, in order to reduce the demand of air supplied to the air supply pipe system using an external compressor. Thereby, the efficiency of the overall system may be improved and the costs may be reduced.

According to an embodiment the turbine comprises an external compressor for supplying air to the air supply pipe system. The external compressor may be a facility different from the turbine which may comprise a rotor having rotor blades different from the rotor and rotor blades of the turbine. Alternatively, a supply of shop air may be provided. Air supplied to the fluid bearing by the external compressor may be required to prevent the fluid from escaping the bearing chamber or to at least reduce the amount of escaped fluid during a shut-down of the turbine.

According to an embodiment the control system is further adapted to change an amount of air supplied by the external compressor to the air supply pipe system. In particular, the control system may be adapted to change the amount of air supplied by the external compressor to the air supply pipe system based on the running condition of the turbine. In particular, during normal operation conditions no air or only a small percentage of air supplied towards the fluid bearing may be generated by the external compressor and the major portion of the air supplied towards the fluid bearing may be generated by the turbine compressor at an intermediate axial position (intermediate stage) of the turbine compressor upstream of the compressor exit. However, during shutdown, in particular hot shut-down of the turbine it may be required to increase the amount of air supplied by the external compressor to the air supply pipe system, in order to prevent the fluid from escaping the fluid bearing or to reach the compressor air passage.

Thereby, in the context of the present invention the flow of air through the turbine compressor defines a flow direction from upstream to downstream providing the possibility to define relative axial positions (positions along the rotation axis of the rotor or turbine shaft) of two elements.

According to an embodiment the fluid bearing comprises a fluid bearing chamber and a bearing fluid supply pipe for supplying bearing fluid to the fluid bearing chamber. The bearing fluid may fill a clearance between a bearing face of the rotor and a bearing face of the bearing chamber to allow smooth rotation of the rotor relative to the bearing chamber upon lubrication of the bearing faces. Further, the bearing fluid may contribute to carry away heat from the rotor. The bearing fluid may continuously be pumped via the bearing fluid supply pipe into the bearing chamber. The bearing fluid supply pipe may be surrounded by an annular return pipe for returning excess fluid, in particular oil. Bearing fluid may be supplied to the fluid bearing chamber via the bearing fluid supply pipe under normal running conditions as well as during hot shut-down in order to carry away heat, in particular residual heat, from the rotor.

According to an embodiment the turbine further comprises a turbine compressor comprising plural rotor blades fixed at the rotor at different axial positions, wherein the control system is adapted to supply air taken from a preferably intermediate axial position of the turbine compressor to the air supply pipe system. In particular, the control system may be adapted to supply air taken from the intermediate axial position of the turbine compressor to the air supply pipe system under normal running conditions. The intermediate axial position of the turbine compressor may be located between a compressor entry for entry of air to be compressed and a compressor exit where compressed air is exited from the compressor. In particular, the intermediate axial position of the turbine compressor may be located upstream the axial position of the compressor exit. Thereby, under normal running conditions it is not necessary, to supply air to the air supply pipe system using an external compressor. Thereby, the demand on air generated by an external compressor is reduced, thus reducing costs and improving efficiency of the overall system.

According to an embodiment the turbine further comprises a stator portion of the turbine housing the fluid bearing chamber, wherein an annular gap is formed between the rotor and the stator portion of the turbine, the annular gap being in communication—particularly air or fluid communication—with an exit of the turbine compressor arranged downstream of the intermediate axial position, the annular gap being as well in communication—particularly fluid communication—with the fluid bearing chamber. The annular gap may also be denoted as an annular clearance delimited by a rotor face on one side and by a stator face on the other side. The rotor face as well as the stator face may have an irregular shape and may in particular not have plane or cylindrical shape, but may have a stepped shape, thus having different diameters at different axial positions.

Since the annular gap or annular clearance is in communication with an exit of the turbine compressor compressed air bled from the compressor exit may enter into the annular clearance and may thus be supplied towards and/or into the fluid bearing chamber. Thereby, in particular under normal running conditions of the turbine, fluid contained within the fluid bearing chamber may be effectively prevented from entering the annular clearance or at least be prevented from entering the turbine compressor exit passage which would adversely affect the operation of the turbine.

According to an embodiment the annular gap is formed by plural labyrinth seals. The labyrinth seals are adapted to allow rotation of the rotor relative to the stator part of the turbine and at the same time to reduce the amount of fluid escaping from the fluid bearing chamber, thereby improving the operation of the turbine.

According to an embodiment the discharge pipe system is in communication with the annular gap. Thereby, it is enabled that excess air being supplied towards the fluid bearing via the annular gap or at least partially flowing within the annular gap may be discharged via the discharge pipe system. Discharge of excess air may in particular be necessary during normal running conditions of the turbine. In contrast, during hot shut-down, the control system may shut off the discharge pipe system or at least reduce a flow rate of air discharging through the discharge pipe system, in order to reduce the demand of air generated by an external air source, such as an external compressor which may be required to be activated in particular during hot shut-down.

According to an embodiment the air supply pipe system is in communication with the annular gap. Thereby, it is enabled that air supplied to the air supply pipe system may be fed at least partially via the annular gap towards the fluid bearing. In particular, the air supply pipe system may be in communication with the annular gap downstream of the turbine compressor exit but upstream of the fluid bearing. Additionally, the air supply pipe system may be in communication with the annular gap downstream of the fluid bearing.

The discharge pipe system may be in communication with the annular gap downstream of the compressor exit and upstream of the fluid bearing. Additionally or alternatively the discharge pipe system may be in communication with the annular gap downstream of the fluid bearing. Communication of the discharge pipe system with the annular gap may be achieved by providing one or more discharge pipes at different axial positions and/or different circumferential positions.

In particular, the air supply pipe system may comprise an annular cavity arranged at a position radially outwards of the annular gap at the corresponding axial position. From this annular cavity one or more air supply pipes may extend radially inwards towards the annular gap. Air may be supplied to the annular cavity from where the air is led through the one or more air supply pipes to the annular gap and from there towards the fluid bearing, in particular towards the fluid bearing chamber comprising the bearing fluid. Thereby fluid may effectively confined within the bearing chamber.

According to an embodiment the control system is further adapted to adjust an amount of air supplied through the air supply pipe system towards the fluid bearing and to adjust an amount of the air discharged through the discharge pipe system such that the bearing fluid is prevented from passing through the gap to the turbine compressor exit. Further, the control system may be adapted to minimize a demand on air supplied by an external compressor by shutting off the discharge pipe system or at least reducing a flow rate of air discharging through the discharge pipe system, while at the same time the bearing fluid is prevented from passing through the annular gap to the turbine compressor exit. Thereby, a safety and efficiency of the overall system may be improved.

According to an embodiment the discharge pipe system comprises a first set, a second set, a third set and a fourth set of discharge pipes, the first set and the second set being arranged axially differently spaced apart from the fluid bearing in a first axial direction running along a rotation axis of the rotor and the third set and the fourth set being arranged differently axially spaced apart from the fluid bearing in a second axial direction opposite to the first axial direction. Thereby, the first set, the second set, the third set and the fourth set may each comprise one or more discharge pipes which may be spaced apart in a circumferential direction. The first set and the fourth set together may comprise multiple discharge pipes positioned at two different axial positions and positioned at plural different circumferential positions.

According to an embodiment the first set and the fourth set of discharge pipes lead to a common discharge pipe and the second set and the third set of discharge pipes lead to a further common discharge pipe. Thereby, the first set and the fourth set of discharge pipes may be positioned axially spaced apart farther from the fluid bearing than the second set and the third set of discharge pipes. The common discharge pipe and also the further common discharge pipe may each comprise an opening, an outlet or a connector which is accessible from the space external to the turbine enabling discharge of the possibly bearing fluid contaminated air in a controlled way.

According to an embodiment the control system comprises a valve arranged in the discharge pipe system. The control system may comprise one or more valves. In particular, the one or more valves may be arranged in the common discharge pipe and/or in the further common discharge pipe and/or in one or more of the discharge pipes of the discharge pipe system. In particular, one valve may be arranged at a point of the common discharge pipe exiting the turbine and one valve may be arranged at a point, where the further common discharge pipe exits the turbine.

Thereby, a piping system for discharging excess air does not need to be redesigned but may be utilized unchanged except for providing a valve in an outlet at the periphery of the turbine.

During hot shut-down an amount of air generated by an external compressor required to prevent the fluid from escaping the fluid bearing may be about 70 normalized $m^3$/hours. Thereby the normalized volume is the volume which the air supplied by the external compressor would occupy, if the air would be at a pressure of one atmosphere and a temperature of zero degrees centigrade. By providing the control system for changing an amount of air discharging through the discharge pipe system a significant portion of this required amount of air may be saved. It is estimated by computer simulation that over 50% of the air generated by an external compressor and supplied towards the fluid bearing may be saved upon shutting off a flow through the discharge pipe system during hot shut-down.

According to an embodiment the valve is pneumatically controlled by air supplied by an external compressor. According to an embodiment the valve may be the more throttled the larger the amount of air is which is supplied by the external compressor. Alternatively or additionally the valve may be controlled based on other parameters and measuring values of the turbine operation condition.

According to an embodiment the air supply system comprises two sets of air supply pipes at different axial positions, one of which is arranged spaced apart from the fluid bearing in an axial direction and the other one of which is arranged axially spaced apart from the fluid bearing in a direction opposite to the axial direction. As mentioned above, the air supply pipes may be in communication with the annular gap and with an annular cavity arranged in the stator portion of the turbine radially farther outwards than the annular gap at the corresponding axial position.

Any features disclosed in the context of embodiments of a turbine described above are applicable individually and/or in combination as well to embodiments of a method for controlling a turbine.

According to an embodiment a method for operating a turbine is provided, wherein the method comprises rotating a rotor supported in a fluid bearing; supplying air towards the fluid bearing via a supply pipe system; discharging a portion of the supplied air via a discharge pipe system; changing, based on a running condition of the turbine, an amount of air discharging through the discharge pipe system using a control system.

According to an embodiment the method further comprises reducing the amount of air discharging through the discharge pipe system during rapid shut-down of the turbine. Rapid shut-down of the turbine may for example occur, when a fuel supply for the combustor of the turbine is interrupted or stopped. Interruption of the fuel supply may for example be necessary, if a system failure occurs.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
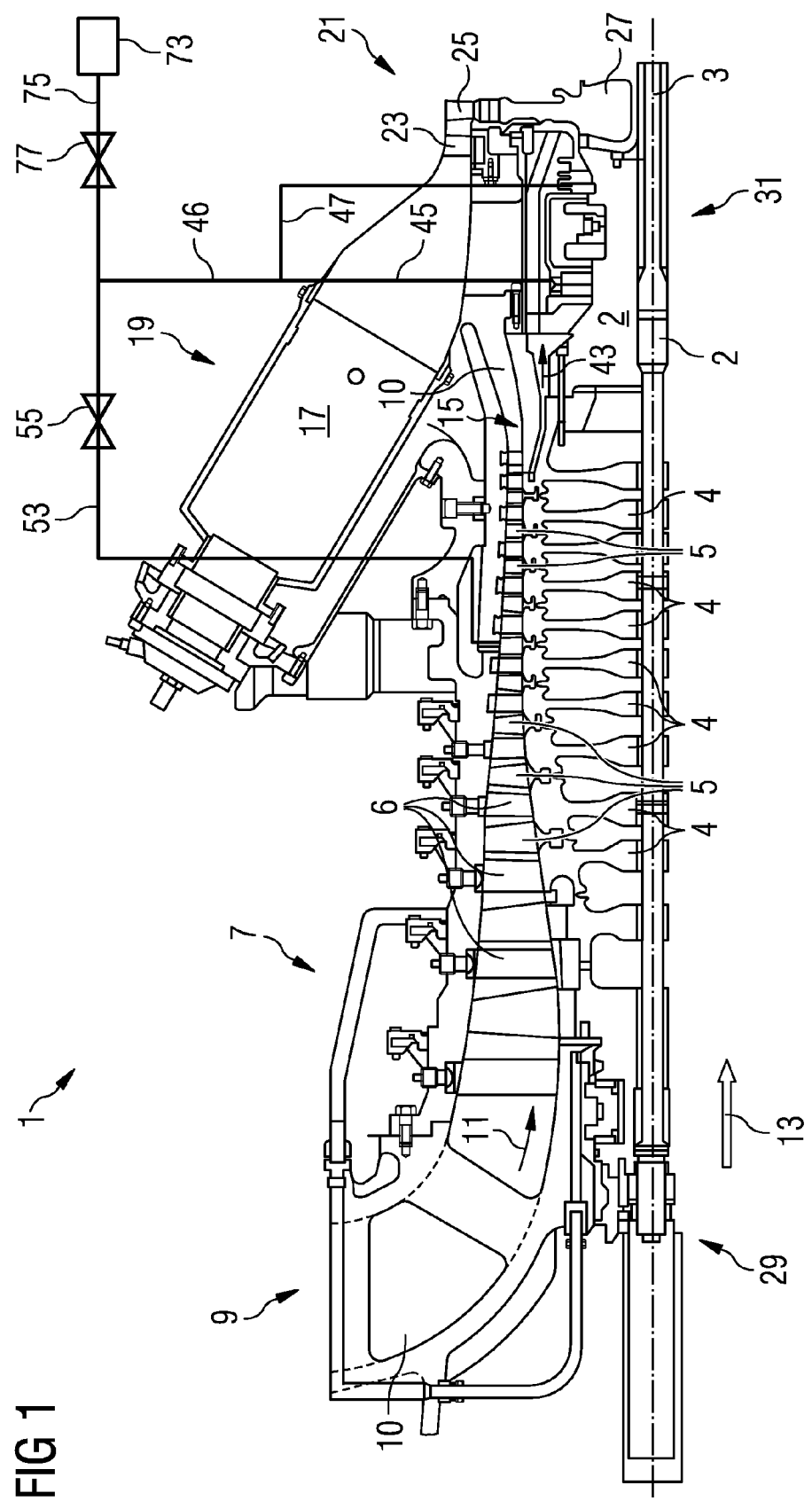
FIG. 1 schematically illustrates a cross-sectional view of a portion of a gas turbine according to an embodiment including air supply paths towards a bearing chamber.

The illustration in the drawing is schematic. It is noted that in different figures, similar or identical elements are provided with the same reference signs or with reference signs, which are different from the corresponding reference signs only within the first digit.

FIG. 1 schematically shows a cross-sectional view of a portion of a gas turbine 1 according to an embodiment. The gas turbine 1 comprises a rotor 2 which can rotate around a rotation axis 3. At the rotor 2 plural rotor blade holders 4 are fixed at which plural rotor blades 5 are clamped therebetween. In other embodiments a row of rotor blades do not need to be clamped between two rotor blade holders but may by fixed to a single blade holder. A rotor blade holder may be arranged as a disc with slots for rotor blades to be mounted. Upon rotation of the rotor 2 the rotor blades 5 rotate within an air passage 10 of a turbine compressor 7 included in the gas turbine 1. Further, the compressor 7 comprises plural guide vanes 6 that are fixed at a stator part of the turbine 1. Air is introduced into the compressor 7 via a compressor entry 9. The air entered into the compressor 7 flows within the air passage 10 in a direction indicated as arrow 11. The arrow 11 defines a direction from upstream to downstream. The direction of arrow 11 at least approximately corresponds to an axial direction 13 running parallel to the rotation axis 3.

Along its passage through the compressor 7 the air entered at the entry 9 is compressed due to the rotation of the rotor blades 5 and exits the compressor 7 at a compressor exit 15. The compressed air is then supplied into a combustion chamber 17 comprised in a combustor 19. Within the combustion chamber 17 the compressed air is mixed with fuel and burned. The high temperature high pressure burned mixture of fuel and compressed air is then supplied to a turbine portion 21 of the gas turbine 1 which is only partially shown in FIG. 1. The turbine portion 21 comprises plural guide vanes 23—only one set of guide vanes 23 is shown in FIG. 1—which guide the high temperature, high pressure fluid exiting from the combustion chamber 17 towards plural rotor blades 25—only one set of rotor blades 25 is shown in FIG. 1—which are connected via rotor blade holders 27 to the rotor 2. Thereby the rotor 2 is driven such that also the rotor blades 5 of the compressor 7 rotate to compress the air.

In order that the rotor 2 can smoothly rotate relative to the stator part 8 (see FIG. 2) of the turbine 1 the rotor 2 is supported by a number of bearings. In the embodiment illustrated in FIG. 1 two bearings are schematically illustrated, wherein the bearing 29 is located approximately at the axial position of the compressor entry 9 and the bearing 31 (also called compressor turbine exit bearing) is located downstream of the exit 15 of the turbine compressor 7.

Figure 2:
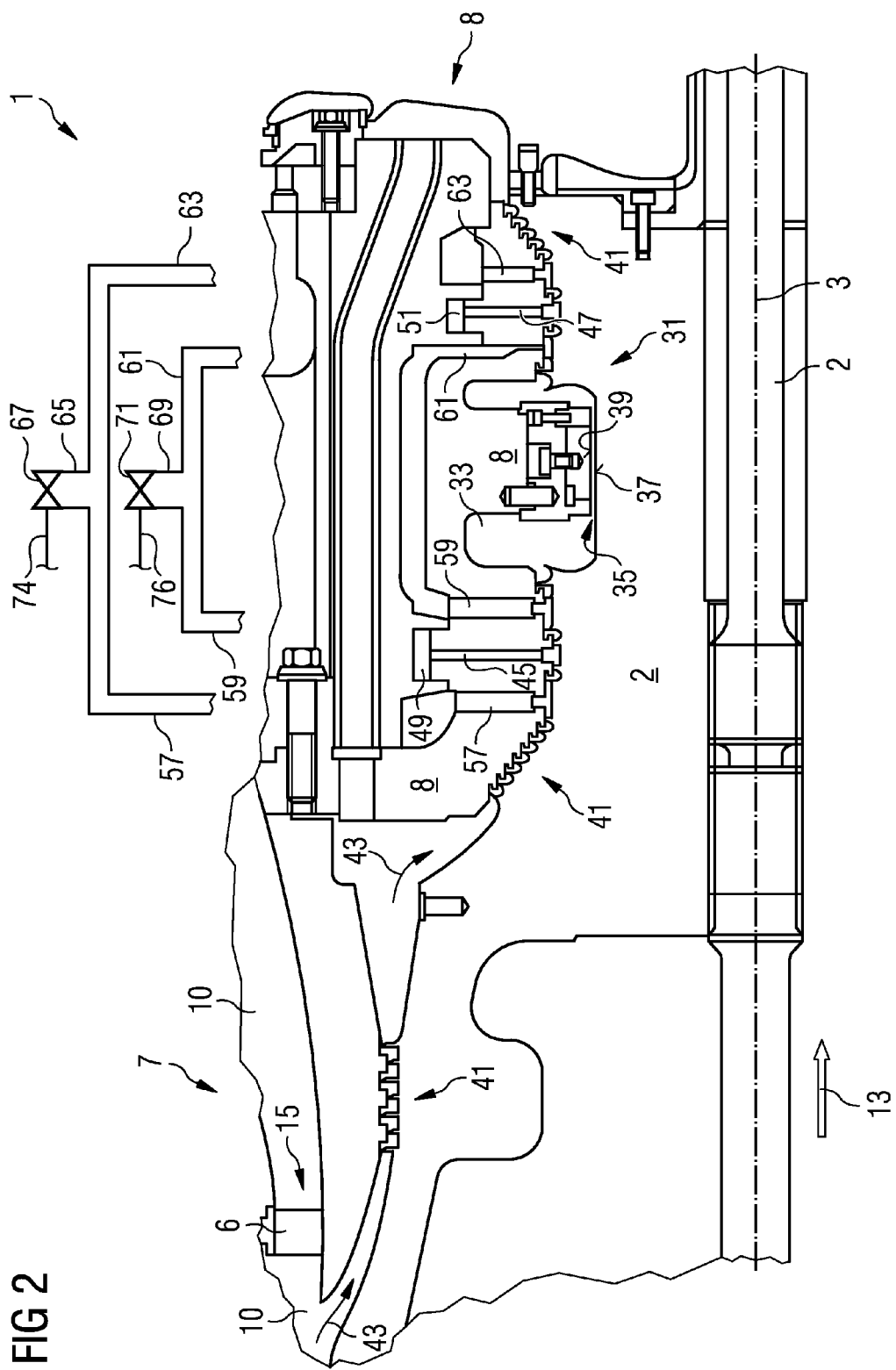
FIG. 2 schematically illustrates a cross-sectional view of the portion of the gas turbine illustrated in FIG. 1 including air discharge paths away from the bearing chamber.

A portion of FIG. 1 is illustrated in FIG. 2, thereby showing the bearing 31 in greater detail. The bearing 31 is a fluid bearing, wherein preferably oil is used as a fluid. Under normal running conditions of the turbine 1 oil is continuously pumped into a bearing chamber 33 via a not illustrated oil supply pipe. The oil contained under pressure within the fluid bearing chamber 33 is utilized to fill a clearance 35 between a bearing face 37 of the rotor 2 and a bearing face 39 of the stator part of the turbine within the fluid bearing chamber 33. The film of oil present within the clearance 35 ensures that the rotor 2 can smoothly rotate relative to the stator part of the turbine 1 upon reduction of friction. The fluid bearing chamber 33 is partly delimited by a surface of the stator part 8 of the turbine 1 and partly delimited by a surface 37 of the rotor 2.

Downstream (to the right in FIG. 2) and upstream (to the left in FIG. 2) of the fluid bearing 31 plural labyrinth seals 41 are arranged between the stator part 8 and the rotor 2. The labyrinth seals 41 form an annular gap or annular clearance between the stator part 8 and the rotor 2. On one hand the seals 41 allow rotation of the rotor 2 relative to the stator part 8 and on the other hand the seals 41 partially prevent the pressurized oil contained within the fluid bearing chamber 33 to escape from the fluid bearing chamber 33. However, the seals 41 can not completely prevent escaping the oil from the fluid bearing chamber 33, since rotation of the rotor 2 relative to the stator part 8 requires some clearance between these two parts and the oil is under high pressure.

Because the labyrinth seals 41 can not provide an absolutely tight sealing function a pressure buffer is built up by introducing a portion of compressed air delivered by the compressor 7 to the compressor exit 15 along a direction indicated by arrow 43. In the illustrated embodiment the compressed air is bled from the air passage 10 of the compressor 7 slightly upstream of the exit 15 of the compressor 7. Other embodiments lead part of the compressed air away from the compressor air passage at another stage of the compressor, for example further upstream or further downstream. The compressed air led away from the compressor air passage 10 along direction 43 may have a temperature between 300° C. and 450° C. according to an embodiment. The hot high pressure air is supplied towards the fluid bearing chamber via the plural labyrinth seals 41 forming an annular clearance. Thereby, the compressed, high temperature air propagating according to direction 43 contributes to preventing the oil from escaping the fluid bearing chamber 33 and entering the compressor air passage 10. All these setting may be configured for full load operation and/or constant rotational speeds and/or constant torque provided by the rotor (within this document this will be considered "normal" condition or "normal" operation of the gas turbine).

To supplement this function of oil escaping prevention an air supply pipe system for supplying air towards the fluid bearing 31 is provided. The air supply pipe system comprises air supply pipes from which only two pipes, namely supply conduit 45 and supply conduit 47 are illustrated in FIG. 2. In particular, in this conduit 45 and conduit 47 may be machined holes in the stator 8. Plural other air supply pipes are arranged at the same axial position as air supply conduit 45 spaced apart in the circumferential direction and plural other air supply pipes at the same axial position as air supply conduit 47 are provided at plural circumferential positions. The air supply pipes arranged at the axial position of air supply conduit 45 are in communication with the annular cavity 49 and the plural air supply pipes at the axial position of the air supply conduit 47 are in communication with the annular cavity 51.

Different air sources may supply air to the annular cavities 49 and 51. As is schematically illustrated in FIG. 1, air may be supplied via a pipe 53 from an intermediate stage of the compressor 7 which provides lower temperature and lower pressure air than provided close to the exit 15 of the turbine compressor 7. A valve 55 may control an amount of air supplied from the intermediate stage of the compressor 7 to the annular cavities 49 and 51. Air from the compressor 7 at the intermediate stage is typically used during normal running conditions of the turbine to supply air to the annular cavities 49 and 51 and thus through the air supply conduits 45 and 47 towards the fluid bearing 31 in order to assist preventing the oil from escaping from the fluid bearing chamber 33 and also to cause cooling. In total the turbine 1 may comprise a number of 8 air supply pipes positioned about the circumference of the turbine 1, only two of which, namely conduit 45 and conduit 47 are shown in FIG. 2.

During these normal running conditions excess air introduced along the direction 43 via the plural labyrinth seals 41 and introduced via the air supply conduits 45 and 47 is discharged using a discharge pipe system comprising plural discharge pipes from which only discharge conduits 57, 59, 61 and 63 are shown in FIG. 2. In particular, the conduits may be machined holes or slots in the stator. The discharge conduits 57, 59, 61 and 63 are in communication with the annular gap including the seals 41 and extend in a radial direction to discharge the excess air radially outwards. Discharge pipes arranged at the axial positions corresponding to discharge conduit 57 and 63 may lead to a common discharge pipe 65 which harbours a valve 67. In analogy the discharge conduits being arranged at the axial positions corresponding to those of the discharge conduits 59 and 61 may lead to a further common discharge pipe 69 harbouring a valve 71. By adjusting or controlling the valves 67 and 71 the amount of air discharging through the air discharge system comprising discharge conduits 57, 59, 61 and 63 and further discharge conduits not illustrated in FIG. 2 may be controlled and may in particular be reduced under not normal running conditions, such as during hot shut-down.

During hot shut-down the amount of compressed air provided at the intermediate position of the compressor 7 guided through pipe 53 may not be sufficient to effectively prevent the oil from escaping the fluid bearing chamber 33. Therefore, during hot shut-down air must be supplied additionally or exclusively by an external compressor 73 as indicated in FIG. 1. Air generated by the external compressor 73 is guided through pipe 75 and its amount is controlled by valve 77 arranged for supplying the air through pipe 46 to air supply conduits 45 and 47.

The valves 67 and 71 of the discharge pipe system may be regulated, e.g. by a control and processing module, via control lines 74 and 76, respectively. While the valves 67 and 71 may be open during normal running conditions of the gas turbine 1, the valve 67 and the valve 71 may be closed or at least throttled during hot shut-down of the gas turbine 1. Thereby, less air generated by the external compressor 73 and introduced through the air supply conduits 45 and 47 is lost through the discharge pipe system including discharge conduits 57, 59, 61, and 63. Thereby, the demand of air generated by the external compressor 73 is reduced thus reducing costs and improving efficiency of the overall system.

During hot shut-down oil may continuously be supplied to the fluid bearing 31 in order to carry residual heat from the turbine 1 away. This may prevent any thermal damage occurring, however, seal (buffer) air supplied via air supply conduits 45 and 47 may still be required, to maintain mass flow over the labyrinth seals 41 and into the bearing chamber 33, thus preventing oil ingress into the seals and discharge conduits 57, 59, 61 and 63.

The common discharge pipe 65 and the further common discharge pipe 69 exit the turbine and allow easy incorporation of the valves 67 and 71. Thereby, the efficiency of the overall system may be improved without the need of redesigning an existing discharge pipe system within the turbine core. The valves 67 and/or 71 may operate in a "sprung open" manner. Should the valves ever fail they might fail in the open position ensuring that running conditions are not affected. When the valves 67, 71 are closed at low speed of the rotor 2 or static conditions, much less seal air should be required to maintain mass flow over the seals 41 into the bearing chamber 33. The valves 67, 71 might be controlled pneumatically by the air generated by the external compressor 73. Alternatively they might be controlled using an electronic control unit.

By the invention, as explained above, particularly the following can be accomplished:

1) When the engine is running at full load condition, the compressor provides more than enough air. However, when the engine is running at low speeds, the air is provided by an external compressor to both the bearings. Advantageously the pressure provided by the external compressor can be reduced significantly by the use of control valves to shut breathers (provided for venting excess hot air away) during low speed and static conditions whilst oil is still required within the bearings. This prevents the air escaping via the breathers (which otherwise would be the easiest escape) thus allowing sealing air requirements to be reduced. One of the features to accomplish this is to place two control valves at the point the pipes exit the core.

2) The invention allows to continue to use oil supply as it may have been implemented before, however a vastly reduced demand for auxiliary air and thus a more feasible accumulator size and/or reduced reliance on auxiliary air volume via an auxiliary compressor set is possible. This is achieved by temporary closure of galleries during hot shutdown whereby all of the reduced supply of buffer air will experience flow restriction at labyrinth seals with no flow as previously at galleries a reduced auxiliary air supply will still maintain a buffer air restriction of oil flow to areas. Galleries should also be throttled to assist with optimization whereby the ability to vent buffer air contaminated with bearing oil back to tank and control of oil foaming in master drain galleries is balanced against the desire to minimize the reliance on auxiliary air supply.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

The invention claimed is:

1. A turbine, comprising:
   a rotor;
   a stator portion;
   a fluid bearing for rotatably supporting the rotor;
   at least one labyrinth seal configured to seal an annular gap between the rotor and the stator portion;
   an air supply conduit system for supplying a stream of air through the annular gap towards the fluid bearing from conduits that feed into the annular gap at first and second positions on opposed sides of the at least one labyrinth seal;
   a discharge conduit system for discharging a portion of air supplied by the air supply conduit system from the annular gap between the first and second positions and from the annular gap downstream of both the first and second positions and upstream of the fluid bearing; and
   a control system arranged to change an amount of air discharging through the discharge conduit system based on a running condition of the turbine.

2. The turbine according to claim 1, wherein the control system is adapted to reduce the amount of air discharging through the discharge conduit system when a rotational speed of the rotor is less than an predetermined value.

3. The turbine according to claim 1, further comprising:
   an external compressor for supplying air to the air supply conduit system.

4. The turbine according to claim 3, wherein the control system is further adapted to change an amount of air supplied by the external compressor to the air supply conduit system.

5. The turbine according to claim 1, wherein the fluid bearing comprises
   a fluid bearing chamber, and
   a bearing fluid supply pipe for supplying bearing fluid to the fluid bearing chamber.

6. The turbine according to claim 1, further comprising:
   a turbine compressor comprising plural rotor blades fixed at the rotor at different axial positions, wherein the control system is adapted to supply air taken from an intermediate axial position of the turbine compressor to the air supply conduit system.

7. The turbine according to claim 6,
   wherein the stator portion encases the fluid bearing chamber wherein the annular gap is in communication with an exit of the turbine compressor as well as with the fluid bearing chamber, the exit of the turbine compressor being arranged downstream of the intermediate axial position.

8. The turbine according to claim 7, wherein the annular gap is sealed via plural labyrinth seals.

9. The turbine according to claim 7, wherein the control system is further configured to adjust
   an amount of air supplied through the air supply conduit system towards the fluid bearing and
   an amount of the air discharged through the discharge conduit system
   such that the bearing fluid is prevented from passing through the gap to the turbine compressor exit.

10. The turbine according to claim 1, wherein the discharge conduit system comprises a first set, a second set, a third set and a fourth set of discharge conduits, the first set and second set being spaced at different axial positions with respect to the fluid bearing in a first axial direction running along a rotation axis of the rotor and the third set and fourth set being spaced at different axial positions with respect to the fluid bearing in a second axial direction opposite to the first axial direction.

11. The turbine according to claim 10, wherein the first set and the second set of discharge conduits lead to a common discharge conduit and the third set and the fourth set of discharge conduits lead to a further common discharge conduit.

12. The turbine according to claim 3, wherein the control system comprises a valve arranged in the discharge conduit system.

13. The turbine according to claim 12, wherein the valve is pneumatically controlled by air supplied by the external compressor.

14. The turbine according to claim 1, wherein the fluid bearing comprises a fluid bearing chamber such that a thin layer of fluid fills a clearance between a bearing face of the rotor and a bearing face of a stator part of the turbine to support the rotor.

* * * * *